United States Patent [19]

Kahmann

[11] Patent Number: 5,409,199
[45] Date of Patent: Apr. 25, 1995

[54] SHOCK ABSORBING FENDER

[76] Inventor: Manfred Kahmann, 116 William St., Beverly, Australia, SA 5009

[21] Appl. No.: 946,416

[22] PCT Filed: May 7, 1991

[86] PCT No.: PCT/AU91/00190

§ 371 Date: Dec. 10, 1992

§ 102(e) Date: Dec. 10, 1992

[30] Foreign Application Priority Data

May 7, 1990 [AU] Australia .................. PJ9997

[51] Int. Cl.6 .................. F16F 1/36; B06G 11/22
[52] U.S. Cl. .................. 267/153; 267/292; 267/293; 114/220
[58] Field of Search ............ 267/136, 140.3, 139, 267/140.5, 140, 141, 141.2, 152, 153, 145, 181, 182, 292, 293; 248/609, 615, 632, 635; 5/663; 15/244.1, 244.4; 138/DIG. 9; 74/551.9, 558; 273/81 R, 81 B, 81 D; 405/212, 213, 215; 114/219, 220

[56] References Cited

U.S. PATENT DOCUMENTS

| | | | |
|---|---|---|---|
| 2,836,228 | 5/1958 | Dahle | 267/145 |
| 3,026,224 | 3/1962 | Rogers | 267/141 |
| 3,045,704 | 7/1962 | Williams | 267/153 |
| 3,202,741 | 8/1965 | Gerson | 264/108 |
| 3,311,331 | 3/1967 | Steimen | 267/153 |
| 3,345,245 | 10/1967 | Hanusa | 138/DIG. 9 |
| 3,496,606 | 2/1970 | Rudge | 425/143 |
| 3,555,832 | 1/1971 | Navabu | 405/215 |
| 3,652,368 | 3/1972 | Formo | 156/501 |
| 3,873,076 | 3/1975 | Evans | 405/215 |
| 3,966,870 | 6/1976 | Vecchiotti | 264/255 |
| 4,058,188 | 11/1977 | Vrillon | 188/377 |
| 4,073,858 | 2/1978 | Chung | 267/152 |
| 4,143,612 | 3/1979 | Ticknor | 114/219 |
| 4,278,726 | 7/1981 | Wieme | 267/140 A |
| 4,342,716 | 8/1982 | Fishbaugh et al. | 264/225 |
| 4,411,556 | 10/1983 | Leblanc et al. | 405/213 |
| 4,548,779 | 10/1985 | Steinberg et al. | 264/255 |
| 4,679,517 | 7/1987 | Kramer | 114/219 |
| 5,014,967 | 5/1991 | Wolf et al. | 267/153 |

FOREIGN PATENT DOCUMENTS

| | | |
|---|---|---|
| 0151930 | 1/1984 | European Pat. Off. . |
| 0150684 | 8/1985 | European Pat. Off. . |
| 2534950 | 4/1984 | France . |
| 1964633 | 10/1970 | Germany .................. 267/293 |
| 2631353 | 1/1978 | Germany . |
| 144613 | 6/1978 | Japan . |
| 1058586 | 2/1967 | United Kingdom . |
| 1184177 | 11/1967 | United Kingdom . |
| 1381863 | 1/1975 | United Kingdom . |
| 1524977 | 9/1978 | United Kingdom . |
| 1564976 | 4/1980 | United Kingdom . |
| 2088524 | 6/1982 | United Kingdom . |
| 2124136 | 2/1984 | United Kingdom . |
| 2174953 | 11/1986 | United Kingdom . |

Primary Examiner—Robert J. Oberleitner
Assistant Examiner—Chris Schwarz

[57] ABSTRACT

A marine fender is disclosed which protects a vessel and a dock from damage caused by an impact. The fender is in the form of a tube with a substantial thickness, is comprised of polyurethane and has a uniform arrangement of cavities or openings in its outer surface. The cavities are formed by a web of walls and have substantial depth but do not penetrate through the thickness of the tube to the interior. The fender may also be comprised of four layers. The first layer is comprised of a Shore A hardness of between 80 and 90 and is approximately 25 mm thick. The second layer is comprised of a Shore A hardness of between 75–80 and is approximately 50 mm thick. The third layer is comprised of a Shore A hardness of between 55–75 and is approximately 50 mm thick. The fourth layer is comprised of a Shore A hardness of between 80 and 90 and is approximately 25 mm thick.

11 Claims, 2 Drawing Sheets

SHOCK ABSORBING FENDER

This invention relates to a shock absorbing fender formed of polyurethane material, and also describes herein, a method and apparatus used to manufacture such a polyurethane shock absorbing device. In particular it relates to a shock absorbing device of substantially cylindrical or tubular construction.

BACKGROUND OF THE INVENTION

Shock absorbing devices of cylindrical construction which are used for protection, find applications in a wide variety of situations. At one extreme of size are marine fenders which are employed to minimize the possibility of damage to wharves and ships during docking procedures, or in heavy seas. At the other extreme of size are shock absorbing components utilised in machines and instrumentation. The aim of this invention is to produce a fender having stable operative characteristics and large energy absorbing ability, relative to its mass and size, coupled with a maximum reaction force when compressed over its designed deflection characteristics which do not exceed the strength of the surfaces or members being protected.

The use of marine fenders to protect ships, wharves, drilling rigs and similar marine structures is well known. Typically these are of substantially cylindrical or tubular construction and may be of circular, D, trapezoid or rectangular cross-section. Various other designs have been employed including inflatable fenders and floating fenders.

Typically tubular fenders are comprised of rubber material or in particular styrene butadiene rubber (SBR). In addition some fenders are formed with metal or hard plastic sections or inserts to provide additional durability, toughness and means of mounting.

Tubular fenders are usually designed to absorb energy by axial or radial elastic compression. The majority of fenders loaded axially are contained within or attached to complex rigid structures or have sophisticated mounting requirements and shapes to handle large deflections which are desirable to minimise the reaction force, which becomes critical when cushioning larger vessels especially those above 150,000 tons, as their steel plate thickness does not increase in direct proportion to their mass. Thus their cost effectiveness becomes less with increasing size. In addition any of these mounting structures which have a considerable inertial mass which is added to the inertial mass of the rubber fender further increases the reaction force to a degree where the vessel's hull is damaged especially where the closing velocity is high.

Similarly prior art tubular fenders which are compressed radially and having other than a substantially circular cross section also contain complexities which reduce their cost effectiveness. Furthermore as these more complex shapes need to be molded as monolithic rubber members for maximum effectiveness and durability there is a practical limitation to their unit size and mass dictated by technological and tooling cost considerations.

Conversely currently used rubber tubular fenders which are compressed radially and having substantially circular cross-sections may be manufactured by a process whereby a strip of uncured rubber is wound around a mandrel until the desired diameter is reached. This lamination is then contained, and cured with heat and pressure. This allows for the manufacture of very large fenders weighing up to 15 tons and costing tens of thousands of dollars. And although their energy absorption per unit mass may not be as efficient as smaller more complex shapes their relatively lower manufacturing maintenance and mounting costs sees their increasing use, even in smaller sizes, typically of 0.4 m O.D. and 0.2 m I.D. where they are installed in lengths secured to docksides or vessels by wires or chains threaded through their hollow cores. Even so it will be appreciated that the larger items are expensive and both labour and material intensive to produce and difficult to handle.

In addition the above fenders commonly of substantially cylindrical construction with a hollow core may be supported by a member or members passed through the hollow core and each end is attached to the marine structure. The fender is thus slung against the side of the structure. A common support member is a semi-elliptical metal rod supported by chains.

These fenders have different operative characteristics depending on the degree of compressive load to which they are subjected. For low loads, the amount of energy absorbed may be a linear function of the radial deflection of the fender surface and the Shear Modulus (G) of the rubber which is dependant on the IRHD of the rubber. For thin sections the load-deformation behaviour has been derived by considering the bending moment that exists at any cross-section. For thick sections the shearing forces and normal forces must be considered. In use the hollow core of the fender may be flattened. At the point inner surface defining a hollow core has been totally compressed the energy absorbing characteristics change to those of a solid pad under compression and the IRHD of the bulk material determines the reaction force. Thus for this type of fender the best performance is achieved where the designed fenders absorb the energy of impact before reaching the limit wherein the characteristics are those of the bulk material.

The publication titled "Theory and Practice of Engineering with Rubber" which has a Library Congress catalogue card number 78-325872 gives a comprehensive outline of rubber design and calculation principles and specifically pages 146 to 165.

With respect to the radial compression of long hollow substantially circular cylinders where the ratio of the outside diameter (O.D.) divided by the internal diameter (I.D.) is generally less than 2.5, and referring to the above publication page 148 onwards and applying general engineering principles with respect to bending stresses in curved beams, it can be appreciated that the maximum fiber stress due to bending moments occurs at the diametric plane normal to the applied force. Provided that the cross-section is regular, and the Shear Modulus is essentially constant over the curved section then the fiber stress varies from a maximum compressive stress at the internal surface to zero at the neutral axis to a maximum tensile stress at the external surface. For this situation the stress distribution is of a hyperbolic nature and the neutral axis is located at a radius other than the radius of the centroid axis. In this situation the neutral axis is located between the centroid axis and the center of curvature; this always occurs in regular sectioned beams of constant material strength. Of course this may not be the case if the sectional area or material strength varies in a radial direction.

Furthermore it can be shown by calculation that for a symmetrical section the maximum bending stress will always occur at the inside fiber surface of the fender. Calculations show that for a fender of O.D. divided by I.D.=2 this bending stress at the inner surface is approximately 25% higher than that at the outer surface.

It is also evident that for a constant reaction force supplied by a fender the discussed bending stresses applied to the fender fibers increase as the ratio of the O.D. divided by the I.D. decreases. For example decreasing the ratio from 2 to 1.5 doubles the bending stresses.

It is an object of this invention to provide a shock absorbing marine fender which provides protection against damage due to impact, and which is simpler to produce and easier to handle than existing devices. It is a further object to provide shock absorbing devices of this invention to have higher lead bearing capacity per unit weight (compared with existing products), and resistance to tear and cut propagation, than existing products.

In this invention a suitable shock absorbing fender can be produced from polyurethane elastomer material. Such fenders perform at least as well as rubber or SBR equivalents and in many aspects are far superior.

BRIEF SUMMARY OF THE INVENTION

According to one form of this invention there is provided a shock absorbing fender comprising polyurethane material, said shock absorbing fender being of a substantially tubular construction and having an outer surface, an inner surface, and two end surfaces said inner surface defining a hollow core through which a supporting member may pass, the outer surface having a number of cavities which divide the outer surface into a grid.

Previously the use of polyurethane in large shock absorbing devices has been limited due to the higher density of solid, high performance polyurethane materials. This increase in the mass coupled with the higher cost of the raw material makes it uneconomical to produce shock absorbing devices of identical design to current rubber devices. It is a discovery of this invention that by introducing cavities into the outer surface of the shock absorbing device, the total amount of polyurethane material can be reduced without seriously affecting the shock absorbing properties of the device. There is a further discovery of this invention that the hardness of polyurethane may be varied between the outer surface and the inner surface in such a way that the shock absorbing properties of the device are not degraded, but the total amount of polyurethane material used is reduced. The net effect is a polyurethane shock absorbing device which has a number of advantages over rubber equivalents.

Polyurethane has a number of advantages for use in shock absorbing devices. Some of these are that the devices can be moulded from liquid feedstock which gives considerably more control than existing hot moulding techniques employed with current rubber devices. The durometer hardness and toughness of the polyurethane can be readily varied during manufacture by varying the composition and proportion of the precursor materials. It can be cast to be completely free of voids, defects and delaminations or alternatively it can be cast as lower density microcellular foam. Furthermore the cure is complete and even.

Properly formulated polyurethane materials are not susceptible to surface stress cracking or flex-fatigue in the way that other currently used rubbers are when attacked by oxygen and ozone. The materials are therefore more resistant to the effects of weathering, than are currently used rubbers, and can be expected to have a longer life in most applications.

The preference the cavities are formed by a web of walls which are generally of similar cross-sectional width and the depth of which is a substantial proportion of the total thickness of the cylindrical wall.

By forming a plurality of cavities in the outer surface the total volume of polyurethane in a shock absorbing device is reduced. This both reduces the total weight of the device and reduces the cost of its production.

If all other things remained unchanged, the introduction of cavities to a shock absorbing device would reduce its lead bearing capacity. More specifically the ability of the device to absorb and dissipate the kinetic energy of an impact is reduced. The benefit of the polyurethane materials is that this loss of load bearing capacity can be compensated for by increasing the formulation hardness of the inner and outer surfaces without a major deterioration of other properties. An added benefit is that by increasing the hardness the abrasion and cut resistance of the surface of the device is improved and its coefficient of friction is reduced. By referring to the hardness it is meant the Shore A hardness as measured by the indentation test.

By increasing the hardness of the material the Shear Modulus is increased and the energy absorbing properties of the device, under conditions of compression when the central void has collapsed, are degraded and the reacting force rises abruptly.

This problem is overcome by reducing the hardness of the bulk material in layers between the inner and outer surfaces. Such variation of hardness is not as readily achievable in the manufacture of current rubber devices. The polyurethane is formulated to provide the highest hardness in layers forming the inner and outer surfaces where the highest fibre stresses are and where the most arduous conditions exist. The lowest hardness is in a layer formed at the neutral axis of the device. The neutral axis is that radial distance from the center of curvature within the curved rubber section undergoing stress whereby the tensile and compressive fibre stresses approach zero.

Accordingly, in a further feature of this invention there is provided a shock absorbing device in which the polyurethane material is of a different hardness at a first radial distance from the inner surface as compared to another radial distance from the inner surface.

In preference there can be provided a skin effect so that an external surface is made and formed from a polyurethane material which has substantial resistance or is in effect a harder material while the material other than the outer skin is of a softer type providing therefore more potential for energy absorption, especially when the central bore is closed. Furthermore it is an advantage of the method of production of a shock absorbing fender of this type that fibres can be introduced into layers during moulding. Therefore, the outermost layer can be of fibre reinforced polyurethane material which has considerable advantages in resisting weathering. A protective coating of polyurethane may also be provided to further enhance weatherability.

As it is possible for water and brine to collect in the cavities, accelerated deterioration of the polyurethane in some environments may occur. To alleviate this problem drain holes can be provided in the bottom of each cavity. Alternatively, cavities may be provided which are both inwardly open and outwardly open.

For production of fenders which incorporate this invention there is provided an apparatus for the production of a shock absorbing device of substantially polyurethane material: comprising a substantially hollow cylindrical drum part adapted to rotate about a cylindrical axis, said drum having a profiled inner surface comprising a plurality of inwardly projecting bosses adapted to produce cavities in a liquid material introduced to the cylinder; a support means adapted to support the cylindrical drum such that the cylindrical axis is substantially horizontal during rotation; means to produce rotation about the cylindrical axis; means to control the speed of rotation of the cylindrical drum; a means of introducing liquid material into the cylindrical drum; and means to maintain a temperature of said liquid.

In preference the means of introducing liquid material into the rotating cylinder comprises a channel containing a plurality of pouring spouts whose number and axial positions correspond to internal circumferential channels formed between the plurality of internal bosses located in the rotating mould, said plurality of internal bosses corresponding in radial and axial position to the plurality of outwardly opening cavities located on the surface of the shock absorbing device.

The inwardly projecting bosses have a dimension and shape corresponding to the plurality of outwardly opened cavities contained within and extending radially inwards from the external cylindrical surface of the shock absorbing device such that their relationship is male to female within the terms of mould and pattern-making.

In preference the bosses are attached to essentially flat longitudinal bars which are movable either in a radial or axial direction with respect to the cylindrical drum to allow withdrawal of the completed shock absorbing device from the cylindrical drum.

In preference the cylindrical drum consists of a rigid hollow cylinder slightly larger in length and diameter than the dimensions of the marine fender to be produced to allow for the space taken up by said flat longitudinal bars.

Alternatively the bosses may be integrally formed with the longitudinal bars. The bars are longer than the fender to be cast but shorter than the rotating cylinder. A number of bars are distributed around the inner surface of the drum with a long axis of the bar being parallel to the rotating axis. The width and number of the bars is such that their longitudinal edges closely abut when affixed to the inner surface of the drum.

In preference the longitudinal bars are semi-rigid and capable of flexure, being preferably attached to the drum at each end.

The flexure of the bar aids in the stripping and removal from the drum of the shock absorbing device after moulding. There is also provided a slight arch in the bar which prevents vibrational damage at low rotational speeds when the drum is empty.

In preference there is provided a rigid removable plate or flange adapted to affix to the open ends of the hollow cylindrical drum to prevent liquid from leaking from the drum. These plates have a central circular open portion through which the means of introducing liquid to the drum enters.

There is also preferentially provided a means of circulating air internally through the cylindrical drum.

In the moulding of a fender according to this invention there is provided a method of producing a polyurethane shock absorbing device having a plurality of cavities comprising the steps of mixing a polyurethane reaction mixture in predetermined proportions and introducing the mixture into a cylindrical drum rotating at a predetermined number of revolutions per minute; rotating the drum containing the mixture until such time as the polyurethane material reaches a tack phase; introducing a further mixture of the same or different composition and repeating the procedure a number of times, each time producing an additional layer, until a shock absorbing device of the appropriate dimensions is produced.

A tack phase is a stage in the curing of the introduced liquid polyurethane material at which the surface is partly cured. Addition of additional material at this stage produces a bond between layers of substantial strength.

The elastomeric polyurethane is produced from a liquid polyurethane reaction mixture which is capable of solidifying by addition polymerization into an elastomeric material. This mixture may be prepared by the one shot, quasi-prepolymer or prepolymer methods using commercially available dispensing and mixing machines. The primary precursors are isocyanates, polyols and diols. Secondary precursors such as carbon pigments, anti-foaming agents or blowing agents can also be included to produce desired characteristics.

In particular the polyurethane reaction mixture is obtained from predominantly difunctional hydroxyl terminated compounds having average equivalent weights of 500 to 1500 and low average functionality polyisocyanate compounds. The isocyanate compounds preferably having a functionality less than 2.4.

The liquid polyurethane reaction mixture is capable of modification to produce specific variations in physical and chemical end properties of the solidified elastomeric material.

The modifications may include: varying the hydroxyl terminated compound as to its chemical composition; using two or more hydroxyl terminated compounds in various ratios; varying the processing conditions prior to or during final mixing; varying the order in which the various reactants are mixed; varying the functionality or equivalent weight of the hydroxyl terminated compounds; using two or more chemically different isocyanate compounds; varying the functionality of the isocyanate compounds; varying the stoichiometry of the reactants away from a theoretically balanced ratio.

The specific variations in properties of the reactant mixture and solidified elastomer may be further affected by the addition of difunctional chain extenders preferably having an equivalent weight of 150 or less. In addition, and always in combination with a chain extender, small quantities of trifunctional or polyfunctional cross linkers may be added to the reactant mixture.

The cross linkers are preferably less than 10% by weight of the chain extender compounds.

The chain extender and cross linker compounds may be added to any of the previously mentioned reactant compounds either prior to or during the final reactant mixing operation.

Also certain compounds known in the field of polyurethane technology as additives may be blended with any of the previously mentioned reactant compounds, or any combination of these previously mentioned compounds either prior to or during final mixing of the polyurethane reaction mixture. The additive compounds may be reactive or non reactive towards any of the compounds previously mentioned as comprising the polyurethane reaction mixture.

A comprehensive list of additives and their uses is outlined in a publication entitled, "The Development and Use of Polyurethane Products" which has a Library of Congress catalogue card number 71-141918. This publication also contains a list of reactants which will combine with isocyanates.

To aid in the understanding of this invention preferred embodiments will be described with the aid of the following drawings, in which.

Figure 1:
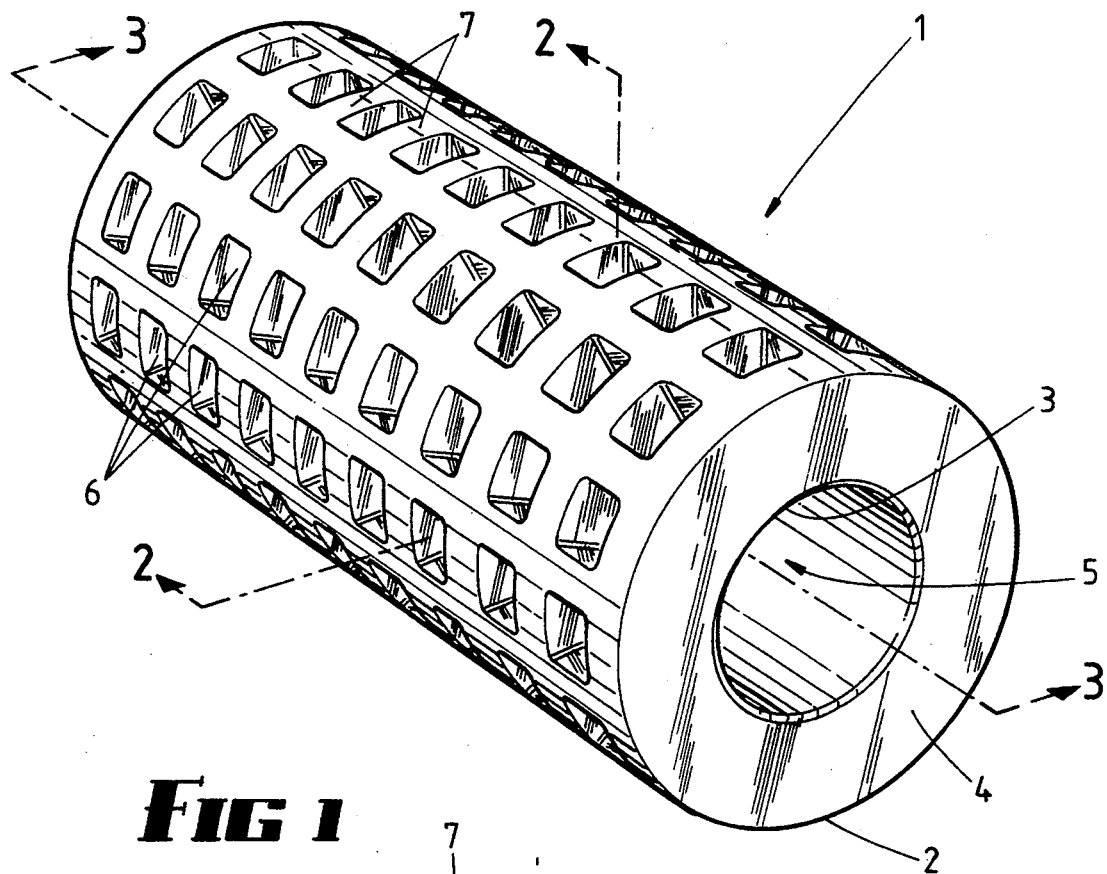
FIG. 1 is a perspective view of a first embodiment of a cylindrical shaped shock absorbing device of circular cross-section having a plurality of cavities.
Figure 2:
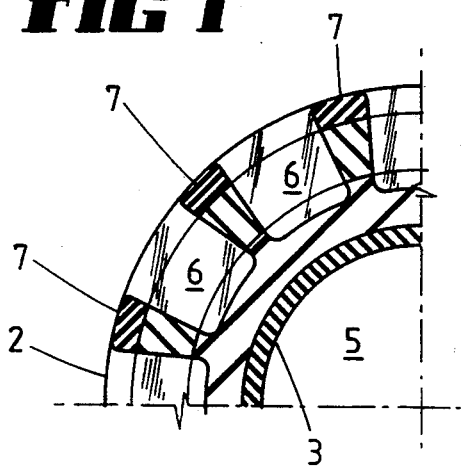
FIG. 2 is a cross-sectional side view through the line 2—2 of the shock absorbing device of FIG. 1.
Figure 3:
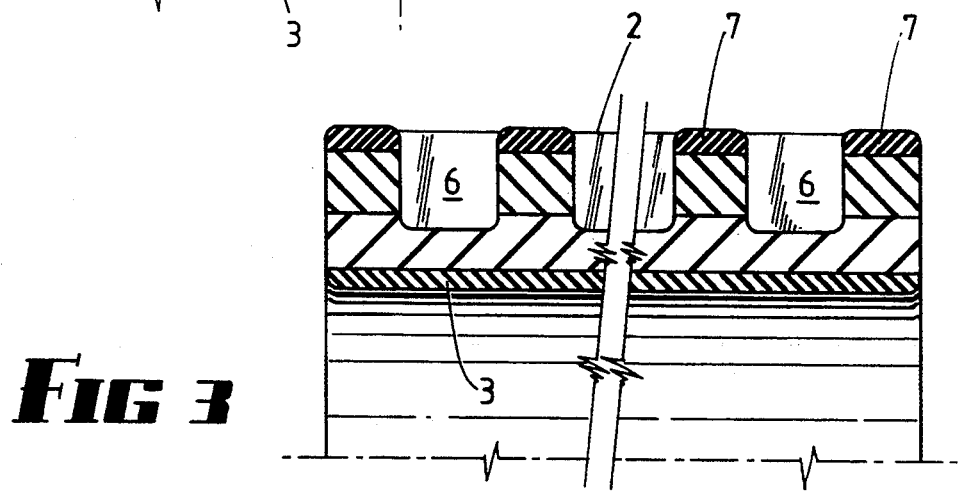
FIG. 3 is a cross-sectional end view through the line 3—3 of the shock absorbing device of FIG. 1; showing the radial variation in hardness.
Figure 4:
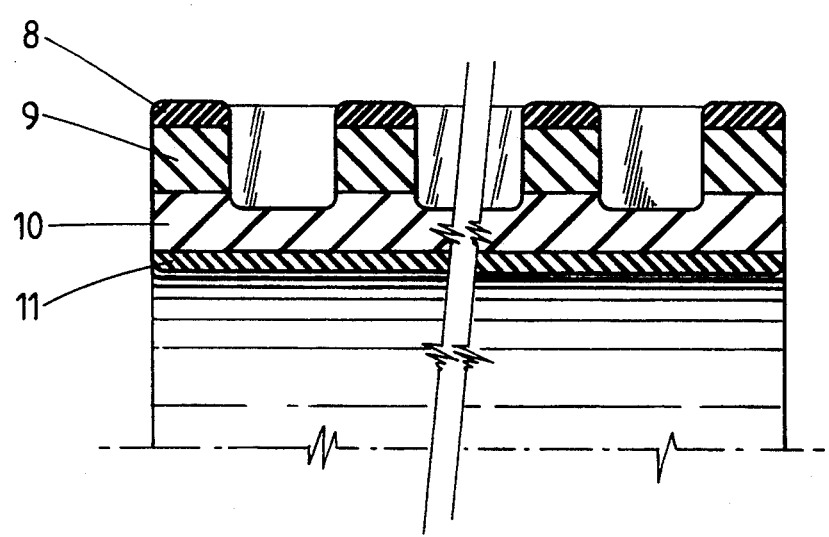
FIG. 4 is a cross-sectional end view as in FIG. 3 showing the radial variation in hardness.
Figure 5:
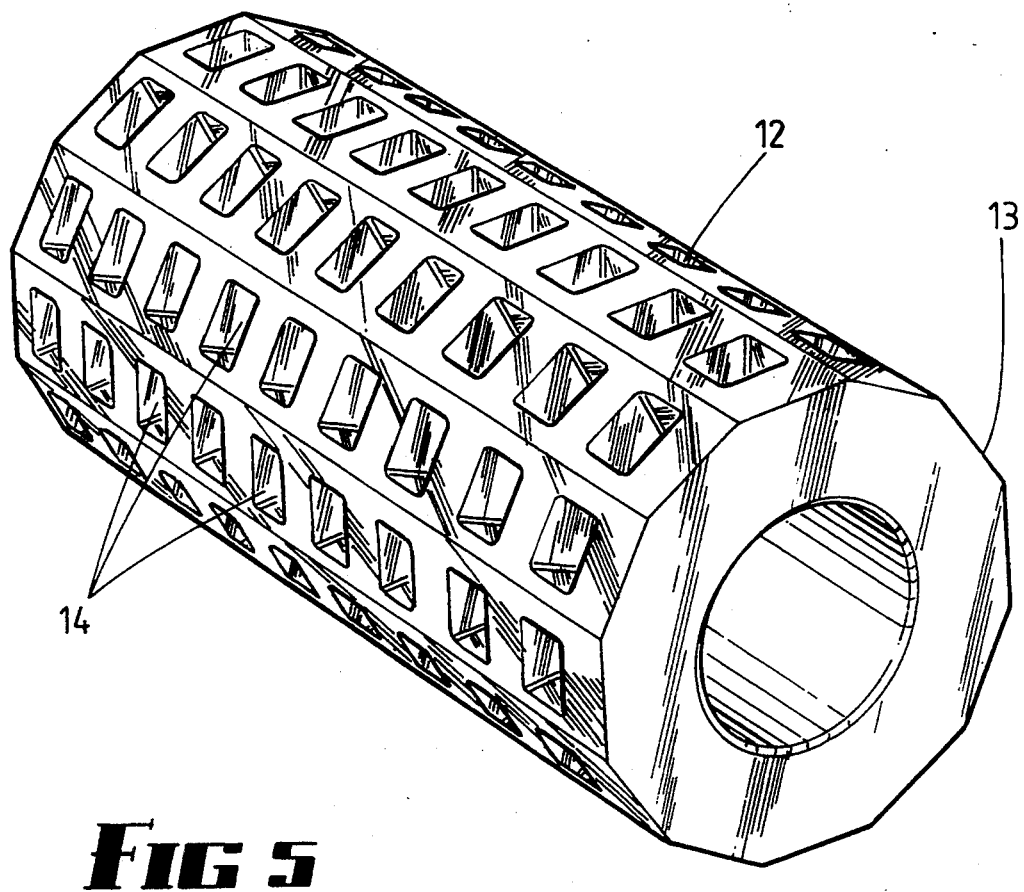
FIG. 5 is a perspective view of a second embodiment of a cylindrical shaped shock absorbing device with a polygonal outer surface having a plurality of cavities.

Referring to the drawings, there is provided a shock absorbing device 1 of circular cross-section, having an outer surface 2, an inner surface 3 and two end surfaces 4. The inner surface 3 defines a hollow core 5 through which a support member may pass. Formed in the outer surface 2 are a number of outwardly open cavities 6 which are defined by an intervening wall system 7. The surfaces 2, 3, 4 and surfaces delineating the recesses are thus defined by skin parts of the marine fender. For example this device may have an outer radius of 900 mm, an inner radius of 450 mm and a total length 2500 min.

The cavities 6 are essentially square in this embodiment but may be of virtually any shape.

There are provided drain holes 6a in the cavities to allow water and brine to drain from the cavities which face upwards. In the absence of drain holes the shock absorbing device may experience accelerated deterioration. To further aid in the weather resisting properties of the device the outer layer may be formulated with fibrous reinforcement.

The device is produced by casting a first layer 8 with Shore A hardness of between 80 and 90. This layer is approximately 25 mm thick. A second layer 9 of 50 mm thickness is cast with a hardness of 75-80 A. This is followed by a third layer 10 which is also approximately 50 mm thick and has a hardness of 55-75 A. Either or both of the second and third layers may be microcellular. Finally an innermost layer 11 is cast of 80-90 Shore A hardness and approximately 25 mm thickness.

A preferred formulation consists of: mixed glycol polyols based on combinations of ethylene and/or diethylene and/or butylene-adipate of equivalent weight of 1000; 1,4 Butane diol and for harder formulations some trimethyl propane; and 4,4 Diphenylmethane diisocyanate. The hardness may be varied by altering the ratio of polyol to diol. For a soft formulation with approximately Shore A hardness of 45 no diol is used and the reactants are mixed in the proportion: 1 equivalent weight of Polyol: 1 equivalent weight of Isocyanate.

For a hard formulation with approximate Shore D hardness of 50 the reactants are mixed in the proportion:

1 equivalent weight of Polyol: 5 equivalent weight of 1,4 Butane Diol: 6 equivalent weight of Isocyanate The exact hardness and properties depends on the variations in processing and amount of the trimethyl propane used to replace some 1,4 Butane Diol, and any slight variation on the NCO percentage. Obviously other hardnesses may be obtained by using other ratios of polyol to diol.

A second embodiment 12 varies from the first in that the outer surface 13 is of a polygonal shape. The cavities 14 are similar to those of the first embodiment.

I claim:

1. A shock absorbing fender comprising a tubular elastomeric device having two end surfaces,
   an inner surface extending between the end surfaces and defining a hollow core,
   an outer surface extending between the end surfaces and surrounding the inner surface,
   a plurality of cavity defining surfaces extending inwardly from said outer surface at least partway to the inner surface, forming cavities separated by cavity walls which divide the outer surface into a grid of intersecting outer surface wall portions, said cavity defining surfaces of each said cavity including circumferentially spaced surfaces, which are generally parallel, such that an adjacent said wall portion has a thickness which decreases towards said inner surface.

2. A shock absorbing fender according to claim 1 wherein said unitary polyurethane elastomer comprises two radially spaced relatively hard layers and a relatively soft layer, said inner and outer surfaces being surfaces of the relatively hard layers and the relatively soft layer being an inner layer lying between the relatively hard layers.

3. A shock absorbing fender comprising a tubular device of monolithic polyurethane elastomer having two end surfaces,
   an inner surface extending between the end surfaces and defining a hollow core,
   an outer surface extending between the end surfaces and surrounding the inner surface,
   a plurality of cavity defining surfaces extending inwardly from said outer surface partway to the inner surface forming cavity walls each of which, in cross-section, has two pairs of generally parallel walls, said cavities dividing the outer surface into a grid of intersecting outer surface wall portions,
   said monolithic polyurethane elastomer comprising four radially spaced layers,
   said inner and outer surface being surfaces of inner and outer of said flow layers which are relatively hard,
   a third of said four layers, contiguous with said inner layer, being relatively soft, and
   a fourth of said layers, between said third and outer layers, having an intermediate hardness which is between the hardness of said third and outer layers.

4. A shock absorbing fender according to claim 3 wherein each said cavity extends radially inwardly approximately two thirds of the distance between said outer and inner surfaces.

5. A shock absorbing fender according to claim 3 further comprising drain holes extending from respective cavities to said inner surface.

6. A marine fender for use in protecting a vessel and a dock from damage caused by impact with one another comprising:
   a) an elongate, tubular, elastomeric body having spaced ends and generally circular and concentric elongate inner and outer surfaces extending from one end to the other, the inner surface defining a hollow core and the outer surface surrounding the inner surface;
   b) the body including four radially spaced layers between the inner surface and the outer surface, each extending from one end to the other;
   c) the inner and outer surfaces being surfaces of inner and outer of said layers which are relatively hard;
   d) a third of said four layers, contiguous with said inner layer, being relatively soft; and
   e) a fourth of said layers, between said third and outer layers, having an intermediate hardness which is between the hardness of said third and outer layers.

7. The fender of claim 6 wherein said third and fourth layers are formed of microcellular material.

8. The fender of claim 6 wherein the geometric configuration of the tubular body is normally cylindrical.

9. The fender of claim 6 wherein the geometric configuration of the tubular body is normally polygonal.

10. A marine fender for use in protecting a vessel and a dock from damage caused by impact with one another comprising:
    a) an elongate, tubular, elastomeric body having spaced ends and generally circular and concentric elongate inner and outer surfaces extending from one end to the other;
    b) the body including radially spaced, relatively hard inner and outer tubular portions respectively adjacent and including skin parts defining the inner and outer surfaces, the inner and outer portions each extending from one end to the other;
    c) the body also including an elongate, tubular, relatively soft, central portion interposed between and in fused connection with the inner and outer portions whereby to provide a unitary tubular fender having high radial compressibility and resistance to ambient condition induced degradation;
    d) wherein said body includes a plurality of generally radially disposed recesses projecting inwardly from outer openings near an imaginary geometric configuration generated by the outer surface and corresponding to an overall configuration of the body generated by the outer surface; and
    e) wherein a plurality of recess defining surfaces extend inwardly from said outer surface at least partway to the inner surface forming said recesses separated by recess walls which divide the outer surface into a grid of intersecting outer surface wall portions, said recess defining surfaces of said recess including circumferentially spaced surfaces which are generally parallel, such that an adjacent said wall portion has a thickness which decreases towards said inner surfaces.

11. The fender of claim 10 wherein at least some of the recesses are through holes each extending from its said opening to an inner surface opening.

* * * * *